United States Patent [19]

Kitamura

[11] Patent Number: 4,924,298
[45] Date of Patent: May 8, 1990

[54] METHOD AND APPARATUS FOR PREDICTIVE CODING
[75] Inventor: Hiroyuki Kitamura, Hiratsuka, Japan
[73] Assignee: Victor Company of Japan, Ltd., Yokohama, Japan
[21] Appl. No.: 245,113
[22] Filed: Sep. 15, 1988
[30] Foreign Application Priority Data
  Sep. 18, 1987 [JP] Japan .................. 62-234073
[51] Int. Cl.⁵ ............................... H04N 7/12
[52] U.S. Cl. ....................... 358/12; 358/133; 358/135; 358/138; 375/27
[58] Field of Search .......... 358/21 R, 23, 12, 133, 358/135, 136, 137, 138, 105; 375/27, 122
[56] References Cited
  U.S. PATENT DOCUMENTS 4,369,464 1/1983 Temime ................. 358/136
  4,468,708 8/1984 Coleman ............... 358/135
  4,720,743 1/1988 Iinuma ................. 358/133
  4,782,387 11/1988 Sabri .................. 358/133
  4,802,004 1/1989 Matsumoto ............. 358/136

FOREIGN PATENT DOCUMENTS
  58-147288 9/1983 Japan .

Primary Examiner—Tommy P. Chin
Attorney, Agent, or Firm—Lowe, Price, LeBlanc, Becker & Shur

[57] ABSTRACT

An analog color video signal is sampled at a frequency which equals a multiple of a frequency of a chrominance subcarrier. The sampled signal is converted into a corresponding first digital signal. The first digital signal is converted into a second digital signal by changing a data arrangement. The second digital signal is processed into a coded signal through a predictive coding process. During the predictive coding process, first data of the second signal are predicted on the basis of second data of the second signal. The first data correspond to a picture element in a first scanning line. The second data correspond to a picture element in a second scanning line adjacent to the first scanning line. The second data picture element is selected from picture elements in the second scanning line at which phases of the chrominance subcarrier are equal to a phase of the chrominance subcarrier at the first data picture element. The selected picture element is spatially closest to the first data picture element. The predicted first data are used in the predictive coding process.

5 Claims, 8 Drawing Sheets (A)

(F)

METHOD AND APPARATUS FOR PREDICTIVE CODING

BACKGROUND OF THE INVENTION

1. Field of the Invention

This invention relates to a method and an apparatus for predictive coding usable in a band reduction of a color video signal.

2. Description of the Prior Art

Band reductions are sometimes used in transmission of video signals. In known band reductions of a color video signal having a chrominance subcarrier, after the color video signal is sampled at a frequency equal to or higher than twice the chrominance subcarrier frequency and is converted into a corresponding digital signal, the digital color video signal is subjected to a predictive coding process.

In the case of a color video signal with a high picture quality, since the band of the color video signal is relatively wide, the sampling frequency is required to be high and thus difference calculation for the predictive coding process tends to be difficult. Japanese published unexamined patent application No. 58-147288 discloses a method of predictive coding which is intended to resolve this problem.

In the predictive coding method of Japanese patent application No. 58-147288, after a color video signal is sampled at a frequency equal to an integer "n" (a natural number greater than one) times the chrominance subcarrier frequency and is converted into a corresponding digital signal, every n-th of the sampled data is successively supplied to a predictive encoder for prediction. In this case, since the time interval between the data from which a predictive value is derived and the data which is to be compared with the predictive value is in agreement with the spatial distance between the corresponding picture elements in a transmitted picture, accurate predictions tend to be difficult for abrupt edge portions in the picture. In such abrupt edge portions, a predictive value and an actual value are greatly different from each other and thus the difference therebetween is large so that a high bit rate tends to be required for accurate transmission. When a low bit rate is used as in general transmissions of video signals, the picture quality of such abrupt edge portions in a reproduced picture is sometimes unacceptable.

SUMMARY OF THE INVENTION

It is an object of this invention to provide an accurate method and an accurate apparatus for predictive coding.

In accordance with this invention, an analog color video signal is sampled at a frequency which equals a multiple of a frequency of a chrominance subcarrier. The sampled signal is converted into a corresponding first digital signal. The first digital signal is converted into a second digital signal by changing a data arrangement. The second digital signal is processed into a coded signal through a predictive coding process. During the predictive coding process, first data of the second signal are predicted on the basis of second data of the second signal. The first data correspond to a picture element in a first scanning line. The second data correspond to a picture element in a second scanning line adjacent to the first scanning line. The second data picture element is selected from picture elements in the second scanning line at which phases of the chrominance subcarrier are equal to a phase of the chrominance subcarrier at the first data picture element. The selected picture element is spatially closest to the first data picture element. The predicted first data are used in the predictive coding process.

DESCRIPTION OF THE FIRST PREFERRED EMBODIMENT

A predictive coding apparatus according to a first embodiment of this invention is designed to process an NTSC signal. Accordingly, an object to be predictively coded is a composite color video signal having a chrominance subcarrier with a frequency fsc. A color video signal is sampled at a frequency which equals a given multiple of the chrominance subcarrier frequency. In this embodiment, the sampling frequency equals 4 times the chrominance subcarrier frequency fsc. A luminance signal and a chrominance signal are directly coded without a separation process.

Figure 1:
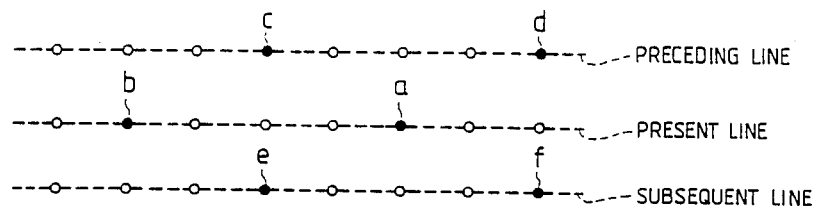
FIG. 1 is a diagram showing an arrangement of sampling points in a portion of one field of an NTSC signal.

FIG. 1 shows an arrangement of sampling points in a portion of one field of an NTSC signal under conditions where the sampling frequency equals 4 times the chrominance subcarrier frequency. In FIG. 1, the white and black circles denote sampling points corresponding to picture elements. At the regularly-spaced sampling points denoted by the black circles, the phases of the chrominance subcarrier are equal.

It is now assumed that the value of the sampling point "a" is estimated through a predictive coding process. In the predictive coding method of Japanese patent application No. 58-147288, the value of the sampling point "a" is predicted on the basis of the value of the nearest sampling point "b" selected from the sampling points which reside in a common scanning line with respect to the sampling point "a" and which correspond to the same phase of the chrominance subcarrier as that at the sampling point "a". In the embodiment of this invention, the value of the sampling point "a" is predicted on the basis of the value of one of the nearest sampling points "c", "d", "e", and "f" selected from the sampling points which correspond to the same phase of the chrominance subcarrier as that at the sampling point "a" and which reside in scanning lines adjacent to the scanning line including the sampling point "a". The sampling points "c" and "d" reside in the scanning line which immediately precedes the scanning line including the sampling point "a". The sampling points "e" and "f" reside in the scanning line which immediately follows the scanning line including the sampling point "a". As shown in FIG. 1, the sampling points "c", "d", "e", and "f" are spatially closer to the sampling point "a" than the sampling point "b" is. Accordingly, the embodiment of this invention allows more accurate predictions than the predictions by the method of Japanese patent application No. 58-147288.

Figure 2:
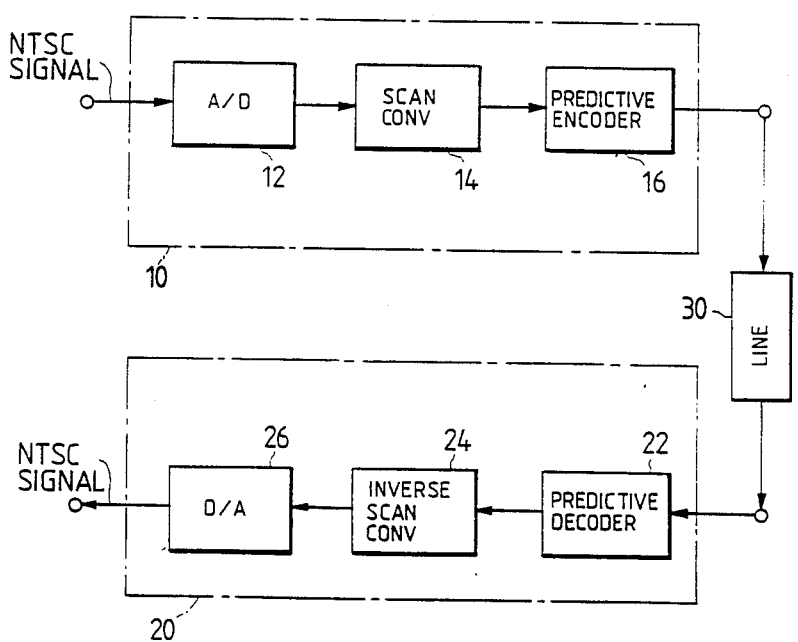
FIG. 2 is a block diagram of a video signal processing and transmitting system including a predictive coding apparatus according to a first embodiment of this invention.

FIG. 2 shows a video signal processing and transmitting system including a predictive coding apparatus according to a first embodiment of this invention. As shown in FIG. 2, the system includes a transmission unit 10 and a reception unit 20 which are connected via a transmission line 30. The transmission unit 10 converts an analog color video signal into a corresponding digital signal, converting the digital signal into a corresponding coded signal through a predictively coding process and then outputting the coded signal to the transmission line 30. The reception unit 20 receives the coded signal from the transmission line, decoding the coded signal into a corresponding digital signal and then converting the digital signal into a corresponding analog color video signal.

The transmission unit 10 includes an analog-to-digital (A/D) converter 12, a scan converter 14, and a predictive encoder 16. The A/D converter 12 samples an input NTSC color video signal at a frequency equal to 4 times the chrominance subcarrier frequency fsc and converts the sampled signal into a correspoding digital signal. The digital signal is inputted into the scan converter 14, being subjected to a scan conversion process which changes an arrangement of the data of the digital signal. It should be noted that a change of data arrangement will vary conditions of scan. The scan converter 14 includes a memory such as a field memory, and an address generator controlling the data write into and the data readout from the memory. The sequence of the data readout differs from the sequence of the data write so that the data arrangement can change. An output digital signal from the scan converter 14 is applied to the predictive encoder 16. For example, in the case where the data of the sampling point "a" (see FIG. 1) is predicted on the basis of the data of the sampling point "c" (see FIG. 1), the change of the data arrangement performed by the scan converter 14 is designed so as to enable the predictive encoder 16 to calculate a predictive value of the data of the sampling point "a" from the value of the data of the sampling point "c" and also to calculate the difference between the predictive value and the actual value of the data of the sampling point "a".

Figure 3:
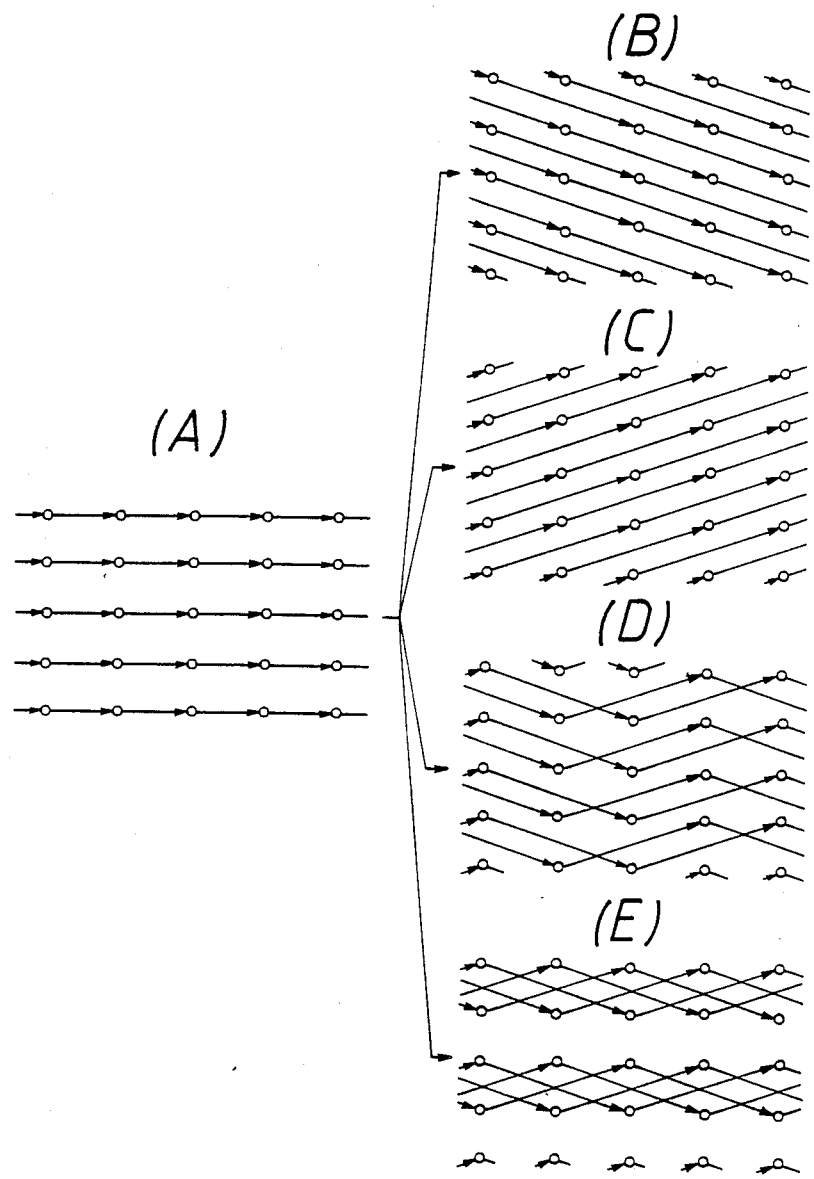
FIG. 3 is a diagram showing conditions of scan conversion in the case of an NTSC signal.

The change of the data arrangement is referred to as the scan conversion. As shown in FIG. 3, there are four different types of the scan conversion. In FIG. 3, the small circles denote respective picture elements. Fig. 3(A) shows a condition of the san of the input signal. FIGS. 3(B), 3(C), 3(D), 3(E) show conditions of the scans of the different types respectively which result from the scan conversion of the input signal.

The output data from the scan converter 14 are inputted into the predictive encoder 16, being subjected to the predictive coding process. The predictive coding is also referred to as differential pulse code modulation (DPCM). In the predictive coding process, known data of a picture element is used in predicting data of another picture element, and the difference between the predictive data value and the actual data value is calculated and then the difference data are coded.

Figure 4:
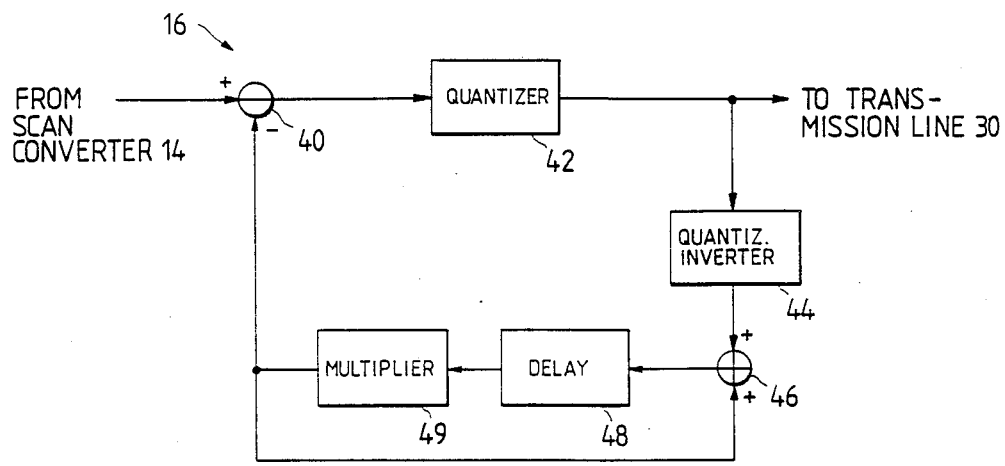
FIG. 4 is a block diagram of the predictive encoder of FIG. 2.

The predictive encoder 16 may be of a known structure including a combination of a quantizer, a delay circuit, an adder, and a subtracter. In this embodiment, as shown in FIG. 4, the predictive encoder 16 includes a subtracter 40, a quantizer 42, a representative value setting circuit or a quantization inverter 44, an adder 46, a delay circuit 48, and a multiplier 49.

The predictive encoder 16 of FIG. 4 operates as follows. The digital data from the scan converter 14 are inputted into the subtracter 40. Data representative of a predictive value are fed to the subtracter 40 from the multiplier 49. The subtracter 40 calculates a difference between the actual value of the input data and the predictive data value. Data representative of this difference are converted by the quantizer 42 into quantized data through a nonlinear quantization process. The quantized data are outputted to the transmission line 30 and the quantization inverter 44. The quantization inverter 44 converts the quantized data into corresponding data through an expansion process having characteristics which are inverse with respect to characteristics of a compression process executed by the quantizer 42. The value of the output data from the quantization inverter 44 and the preceding predictive value are added by the adder 46, forming added data. The delay circuit 48 retards the added data by a time corresponding to one sampling period. The multiplier 49 multiplies the value of the output data from the delay circuit 48 by a predictive coefficient $\alpha$, thereby calculating a predictive value of subsequent input data. The predictive coefficient $\alpha$ is in the range of 0 to 1, and is preferably in the range of 0.95 to 0.98. As described previously, the predictive value is supplied to the subtracter 40 and the adder 46.

As shown in FIG. 2, the reception unit includes a predictive decoder 22, an inverse scan converter 24, and a digital-to-analog (D/A) converter 26. The predictive decoder 22 receives coded data from the transmission line 30 and decodes the coded data into corresponding digital data. The output digital signal from the predictive decoder 22 is inputted into the inverse scan converter 14, being subjected to a scan conversion process which changes an arrangement of the data of the digital signal in a manner opposite or inverse with respect to the manner of the change of the data arrangement by the scan converter 14 of the transmission unit 10. Accordingly, the arrangement of the data of the output signal from the inverse scan converter 24 agrees with the arrangement of the data of the input signal into the scan converter 14. Specifically, the scan conversion by the scan converter 24 returns the condition of the scan of one of FIGS. 3(B), 3(C), 3(D), and 3(E) to the condition of the scan of FIG. 3(A). The scan converter 24 includes a memory such as a field memory, and an address generator controlling the data write into and the data readout from the memory. The sequence of the data readout differs from the sequence of the data write so that the data arrangement can change. The output digital signal from the scan coverter 24 is converted by the D/A converter back into a corresponding NTSC color video signal which is fed to a television monitor (not shown) or the like.

Figure 5:
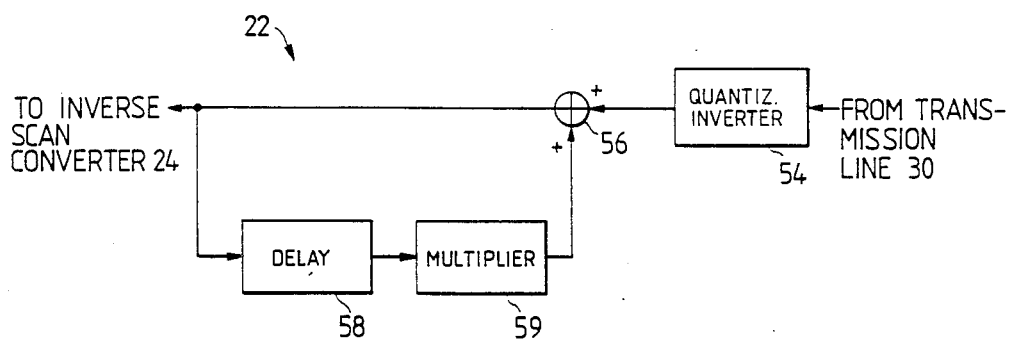
FIG. 5 is a block diagram of the predictive decoder of FIG. 2.

As shown in FIG. 5, the predictive decoder 22 includes a representative value setting circuit or a quantization inverter 54, an adder 56, a delay circuit 58, and a multiplier 59. The quantization inverter 54 receives the digital data from the transmission line 30 and converts the received data into corresponding data through a process which is inverse with respect to the quantization process in the quantizer 42 (see FIG. 4) of the predictive encoder 16. The value of the output data from the quantization inverter 54 and a predictive value are added by the adder 56, forming added data as an output data of the predivetive decoder 22. The predictive value is represented by an output digital signal from the multiplier 59. The added data are inputted into the inverse scan converter 24 and the delay circuit 58. The delay circuit 58 retards the input data by a time corresponding to one sampling period. The multiplier 59 multiplies the value of the output data from the delay circuit 58 by the predictive coefficient $\alpha$, thereby calculating a predictive value of subsequent input data. As described previously, the predictive value is supplied to the adder 56.

Figure 6:
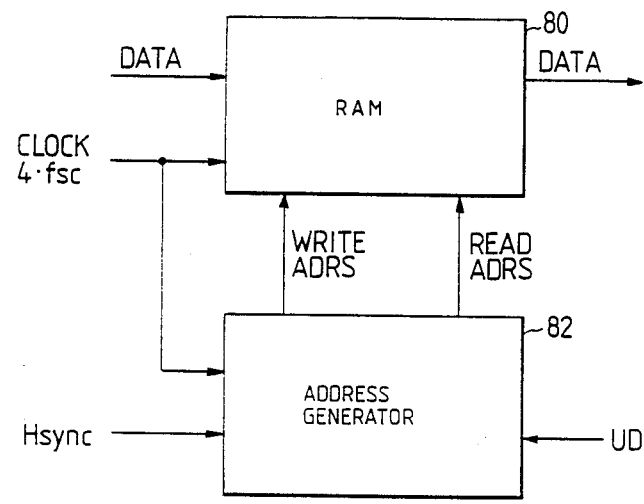
FIG. 6 is a block diagram of the scan converter of FIG. 2.

As shown in FIG. 6, the scan converter 14 of the transmission unit 10 includes a random access memory (RAM) 80 and an address generator 82. The data outputted from the A/D converter 12.(see FIG. 2) are sequentially written into storage locations of the RAM 80 which are designated by write addresses fed from the address generator 82. The write addresses have 20 bits. The data are read out from storage locations of the RAM 80 which are designated by read addresses fed from the address generator 82. The read addresses have 20 bits. The readout data are transferred to the predictive encoder 16 (see FIG. 2). The data write into and the data readout from the RAM 80 are designed so that the scan condition of FIG. 3(A) can be converted into the scan condition of one of FIGS. 3(B), 3(C), 3(D), and 3(E).

The address generator 82 produces a write address signal and a read address signal in accordance with a clock signal, a horizontal sync signal, and an up/down (UD) control signal. The clock signal has a frequency equal to 4 times the chrominance subcarrier frequency fsc.

Figure 7:
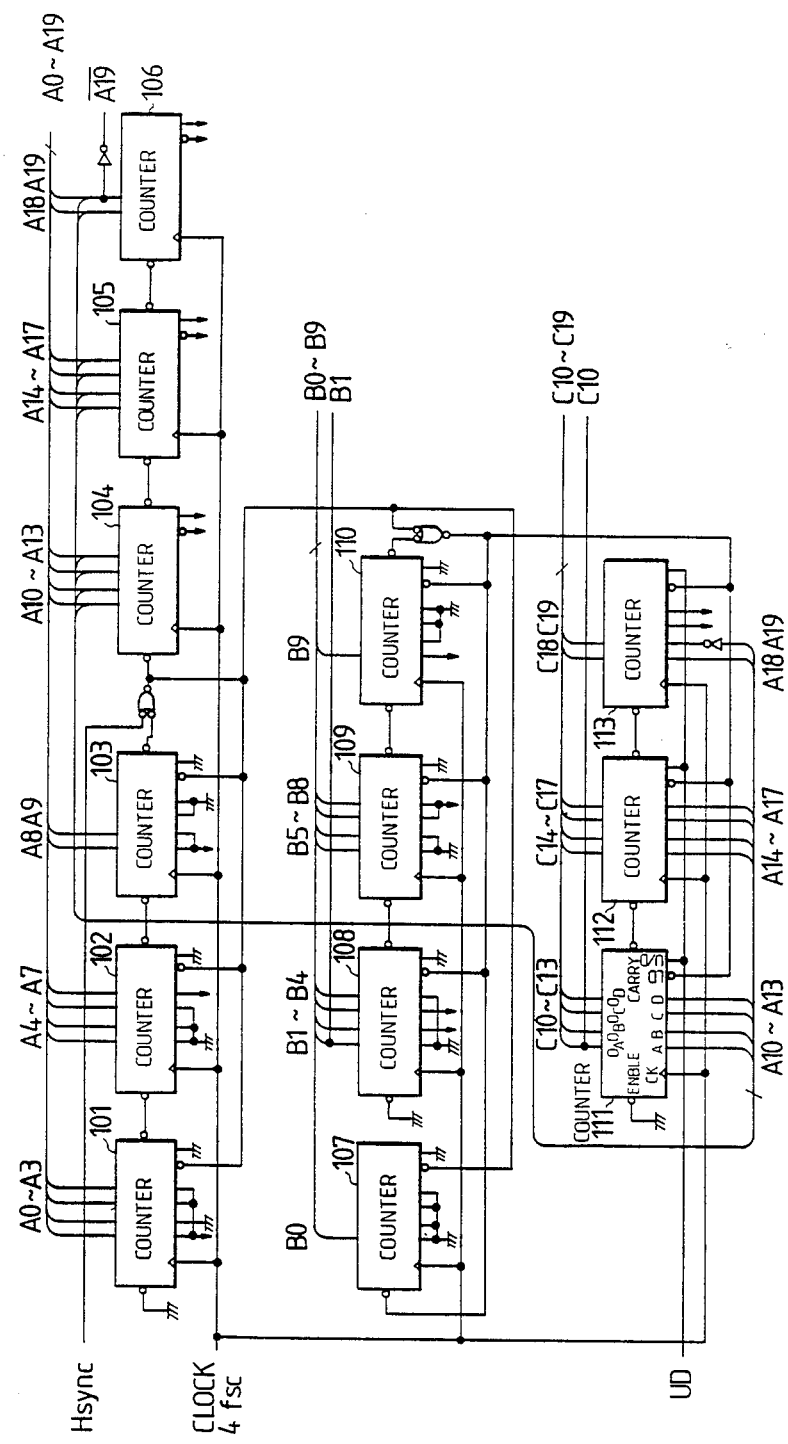
FIGS. 7 and 8 are block diagrams of the address generator of FIG. 6.
Figure 8:
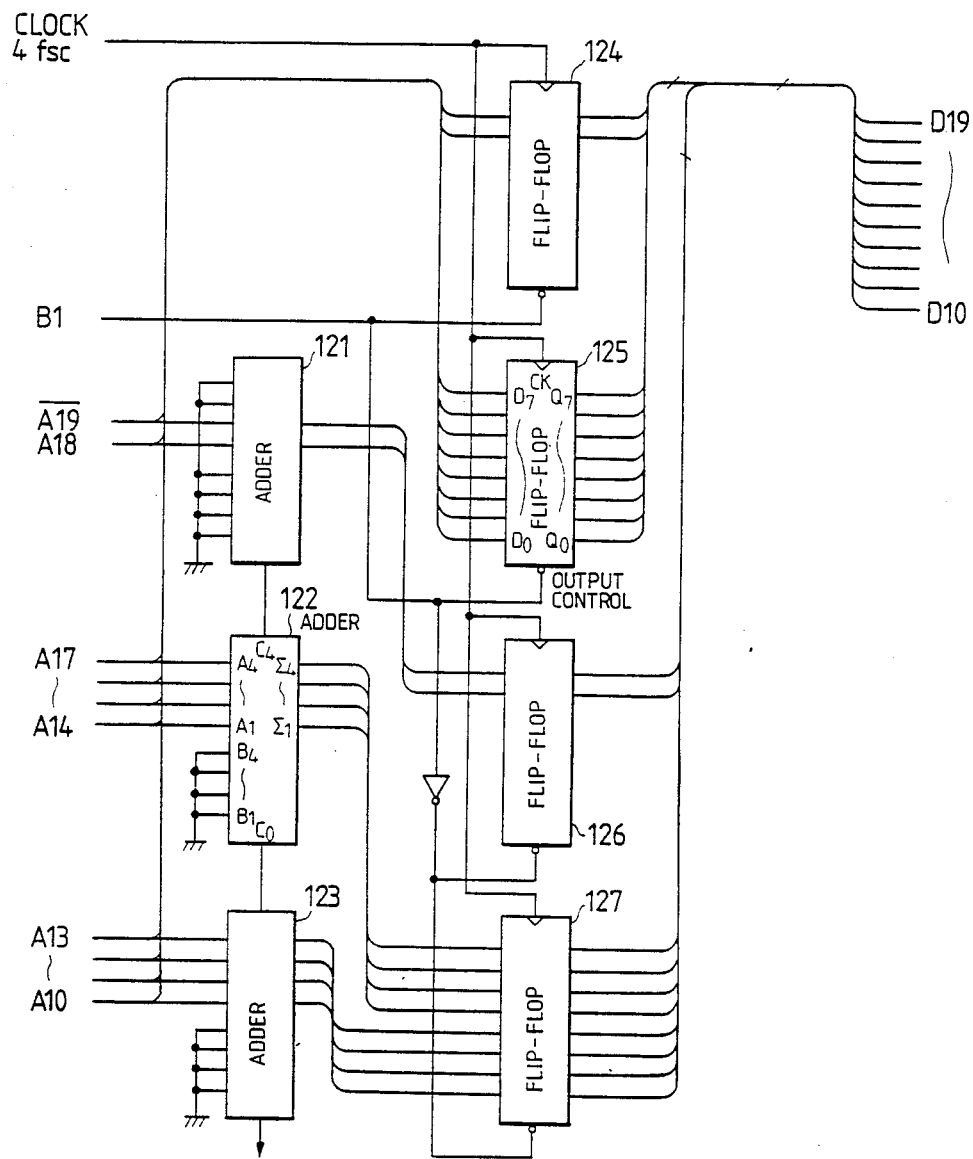

The address generator 82 has first and second sections shown in FIGS. 7 and 8 respectively. In the Figures, terminals connected to a fixed high level signal are depicted by arrows. As shown in FIG. 7, the first section of the address generator 82 includes a combination of synchronous presettable up/down binary counters 101–113. The counters 101–106 generate address bits A19–A0. Specifically, the counters 104–106 generate upper bits A19–A10 in accordance with the horizontal sync signal. The upper bits A19–A10 vary incrementally from "0" to "1023" in response to horizontal sync pulses. After the upper bits A19–A10 reach "1023", they return to "0". The upper bits A19–A10 represent horizontal scanning lines. The counters 101–103 generate lower bits A9–A0 in accordance with the clock signal. The lower bits A9–A0 vary decrementally from "909" to "0" in response to clocks. After the lower bits A9–A0 reach "0", they return to "909". The lower bits A9–A0 represent sampling points in reversal order on respective scanning lines.

The counters 107–110 generate address bits B9–B0. Specifically, the counters 108–110 generate address bits B9–B1 in accordance with the horizontal sync signal and the clock signal. The address bits B9–B1 are preset to "454" by a horizontal sync pulse. The address bits B9–B1 are decremented by "1" in response to each of clocks. When the address bits B9–B1 reach "0", the counter 110 which generates the address bit B9 outputs a carry signal, presetting again the address bits B9–B1 to "454". The counter 107 generates the address bit B0. The address bit B0 is preset to "1" by a horizontal sync pulse. The address bit B0 is changed to "0" by the carry signal fed from the counter 110. Accordingly, the address bits B9–B0 are preset to "909" by a horizontal sync pulse. The address bits B9–B0 are decremented by two in response to each of clocks. After the address bits B9–B0 reach "1", they are preset to "908" by the carry signal. Then, the address bits B9–B0 are decremented by two in response to each of clocks.

The counters 111–113 generate address bits C19–C10 in accordance with the horizontal sync signal, the clock signal, the UD signal, and the carry signal outputted from the counter 110. In the case where the UD signal is in a high level state, the address bits C19–C10 are preset by a horizontal sync pulse and the carry signal to a value equal to the value of the address bits $\overline{A19}$,A18–A10, and the address bits C19–C10 are incremented by "1" in response to each of clocks. In the case where the UD signal is in a low level state, the address bits C19–C10 are preset by a horizontal sync pulse and the carry signal to a value equal to the value of the address bits $\overline{A19}$,A18–A10, and the address bits C19–C10 are decremented by "1" in response to each of clocks.

As shown in FIG. 8, the second section of the address generator 82 includes a combination of 4-bit binary full adders 121–123 and octal 3-states D flip-flops 124–127. The adders 121–123 add "1" to the value of the address bits $\overline{A19}$,A18–A10. A carry input terminal of the lowest adder 123 is subjected to a high level signal. The flip-flops 124–127 select one of the value of the address bits $\overline{A19}$,A18–A10 and the sum of the value of the address bits $\overline{A19}$,A18–A10 and "1" in accordance with a signal Bl, outputting the selected value as address bits D19–D10. The signal B1 is inverted in response to each of clocks.

In the case of the scan conversion from the condition of FIG. 3(A) to the condition of FIG. 3(B): the address bits A19–A0 are used as the write address signal; the address bits C19–C10 are used as the upper bits of the read address signal; the address bits B9–B0 are used as the lower bits of the read address signal; and the UD signal is in the high level state. In the case of the scan conversion from the condition of FIG. 3(A) to the condition of FIG. 3(C): the address bits A19–A0 are used as the write address signal; the address bits C19–C10 are used as the upper bits of the read address signal; the address bits B9–B0 are used as the lower bits of the read address signal; and the UD signal is in the low level state. In the case of the scan conversion from the condition of FIG. 3(A) to the condition of FIG. 3(D): the address bits A19–A0 are used as the write address signal; the address bits D19–D10 are used as the upper bits of the read address signal; the address bits B9–B0 are used as the lower bits of the read address signal; and the UD signal is in the high level state. In the case of the scan conversion from the condition of FIG. 3(A) to the condition of FIG. 3(E): the address bits A19–A0 are used as the write address signal; the address bits $\overline{A19}$,A18–A11,C10 are used as the upper bits of the read address signal; the address bits B9–B0 are used as the lower bits of the read address signal; and the UD signal is in the high level state.

An internal structure of the inverse scan converter 24 (see FIG. 2) within the reception unit 20 is similar to the internal structure of the scan converter 14 of FIGS. 6-8 except for the following design changes. In the case of the scan conversion from the condition of FIG. 3(B) to the condition of FIG. 3(A): the address bits A19-A0 are used as the read address signal; the address bits C19-C10 are used as the upper bits of the write address signal; the address bits B9-B0 are used as the lower bits of the write address signal; and the UD signal is in the high level state. In the case of the scan conversion from the condition of FIG. 3(C) to the condition of FIG. 3(A): the address bits A19-A0 are used as the read address signal; the address bits C19-C10 are used as the upper bits of the write address signal; the address bits B9-B0 are used as the lower bits of the write address signal; and the UD signal is in the low level state. In the case of the scan conversion from the condition of FIG. 3(D) to the condition of FIG. 3(A): the address bits A19-A0 are used as the read address signal; the address bits D19-D10 are used as the upper bits of the write address signal; the address bits B9-B0 are used as the lower bits of the write address signal; and the UD signal is in the high level state. In the case of the scan conversion from the condition of FIG. 3(E) to the condition of FIG. 3(A): the address bits A19-A0 are used as the read address signal; the address bits $\overline{A19}$,A18-A11,C10 are used as the upper bits of the write address signal; the address bits B9-B0 are used as the lower bits of the write address signal; and the UD signal is in the high level state.

DESCRIPTION OF THE SECOND PREFERRED EMBODIMENT

A second embodiment of this invention is similar to the embodiment of FIGS. 1-8 except for design changes described hereinafter. The second embodiment is designed to process a PAL signal.

Figure 9:
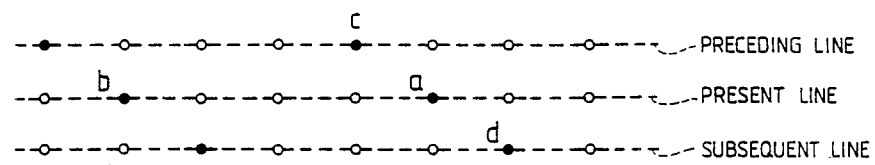
FIG. 9 is a diagram showing an arrangement of sampling points in a portion of one field of a PAL signal.

FIG. 9 shows an arrangement of sampling points in a portion of one field of a PAL signal under conditions where the sampling frequency equals 4 times the chrominance subcarrier frequency. In FIG. 9, the white and black circles denote sampling points corresponding to picture elements. The phases of the chrominance subcarrier are equal at the sampling points denoted by the black circles. Specifically, the phase of the chrominance subcarrier at the sampling point "a" is equal to the phases of the chrominance subcarrier at the sampling points "b", "c", and "d". Accordingly, the data of the sampling point "a" can be predicted from the data of one of the sampling points "b", "c", and "d". Since the sampling points "c" and "d" are closer to the sampling point "a" than the sampling point "b" is, it is preferable to use the data of one of the sampling points "c" and "d" in predicting the data of the sampling point "a".

Figure 10:
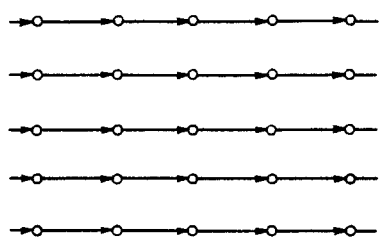
FIG. 10 is a diagram showing conditions of scan conversion in the case of a PAL signal.
Figure 10:
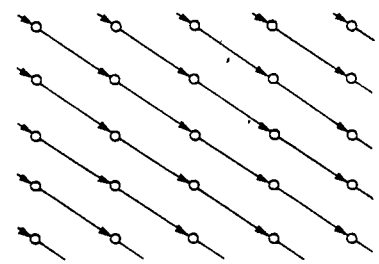

The scan converter 14 (see FIG. 2) changes the scan condition of FIG. 10(A) to the scan condition of FIG. 10(F). The inverse scan converter 24 (see FIG. 2) changes the scan condition of FIG. 10(F) to the scan condition of FIG. 10(A).

Figure 11:
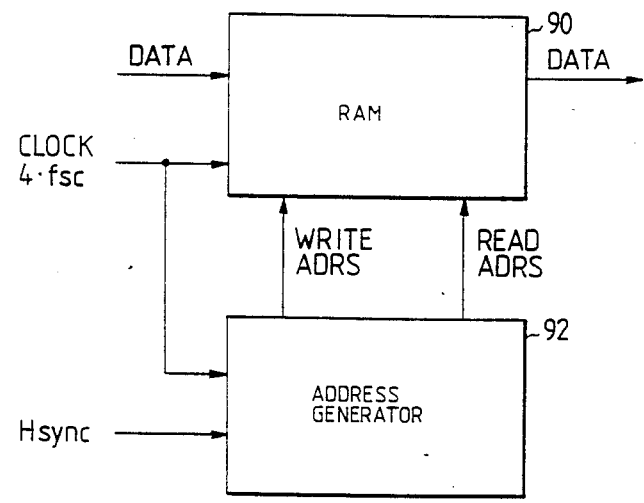
FIG. 11 is a block diagram of a scan converter in a second embodiment of this invention.

As shown in FIG. 11, the scan converter 14 of the transmission unit 10 includes a random access memory (RAM) 90 and an address generator 92. The data outputted from the A/D converter 12 (see FIG. 2) are sequentially written into storage locations of the RAM 90 which are designated by write addresses fed from the address generator 92. The write addresses have 23 bits. The data are read out from storage locations of the RAM 90 which are designated by read addresses fed from the address generator 92. The read addresses have 23 bits. The readout data are transferred to the predictive encoder 16 (see FIG. 2). The data write into and the data readout from the RAM 90 are designed so that the scan condition of FIG. 10(A) can be converted into the scan condition of FIG. 10(F).

The address generator 92 produces a write address signal and a read address signal in accordance with a clock signal and a horizontal sync signal. The clock signal has a frequency equal to 4 times the chrominance subcarrier frequency fsc.

Figure 12:
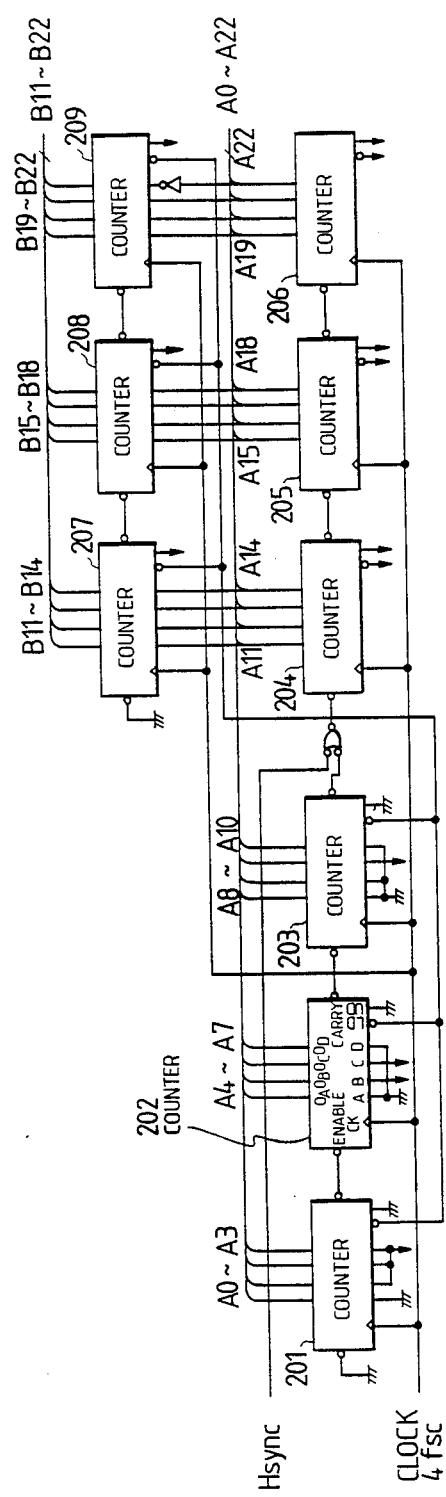
FIG. 12 is a block diagram of the address generator of FIG. 11.

As shown in FIG. 12, the address generator 92 includes a combination of synchronous presettable up-/down binary counters 201-209. The counters 201-206 generate address bits A22-A0. Specifically, the counters 204-206 generate upper bits A22-A11 in accordance with the horizontal sync signal. The upper bits A22-A11 are incremented by each of horizontal sync pulses. After the upper bits A22-A11 reach the maximum count value "4096", they return to "0". The upper bits A22-A11 represent horizontal scanning lines. The counters 201-203 generate lower bits A10-A0 in accordance with the clock signal and the horizontal sync signal. The lower bits A10-A0 are preset to "1134" by a horizontal sync pulse. The lower bits A10-A0 are decremented by "1" in response to each of clocks. When the lower bits A10-A0 reach "0", the counter 203 which outputs the address bits A10-A8 generates a carry signal. At the same time, a subsequent horizontal sync pulse usually occurs so that the lower address bits A10-A0 are preset to "1134" again. The lower bits A10-A0 represent sampling points in reversal order on respective scanning lines.

The counters 207-209 generate address bits B22-B11 in accordance with the horizontal sync signal and the clock signal. The address bits B22-B11 are preset by a horizontal sync pulse to a value equal to the value of the address bits $\overline{A22}$,A21-A11. The address bits B22-B11 are incremented by "1" in response to each of clocks.

The address bits A22-A0 are used as the write address signal. The address bits B22-B11 are used as upper bits of the read address signal. The address bits A10-A0 are used as lower bits of the read address signal.

An internal structure of the reverse scan converter 24 (see FIG. 2) within the reception unit 20 is similar to the internal structure of the scan converter 14 of FIGS. 11 and 12 except for the following design changes. The address bits A22-A0 are used as the read address signal. The address bits B22-B11 are used as upper bits of the write address signal. The address bits A10-A0 are used as lower bits of the write address signal.

What is claimed is:
1. A method comprising the steps of:
 (a) sampling an analog color video signal at a frequency which equals a multiple of a frequency of a chrominance subcarrier of the color video signal;
 (b) converting the sampled signal into a corresponding first digital signal;
 (c) changing an arrangement of data of the first digital signal and thereby converting the first digital signal into a second digital signal;
 (d) processing the second digital signal into a coded signal through a predictive coding process;
 (e) during the predictive coding process, predicting first data of the second digital signal on the basis of only second data of the second digital signal, the first data corresponding to a first data picture ele- ment in a first scanning line, the second data corresponding to only a single second data picture element in a second scanning line adjacent to the first scanning line, the second data picture element being selected from picture elements in the second scanning line at which phases of the chrominance subcarrier are equal to a phase of the chrominance subcarrier at the first data picture element, the selected second data picture element being spatially closest to the first data picture element; and (f) using the predicted first data in the predictive coding process.

2. The method of claim 1 further comprising the steps of:
(a) transmitting the coded signal;
(b) receiving the coded signal;
(c) decoding the received coded signal into a third digital signal through a predictive decoding process;
(d) changing an arrangement of data of the third digital and thereby converting the third digital signal into a fourth digital signal; and
(e) converting the fourth digital signal into a corresponding analog color video signal.

3. An apparatus comprising:
(a) means for sampling a color video signal at a frequency which equals a multiple of a frequency of a chrominance subcarrier of the color video signal;
(b) means for converting the sampled signal into a corresponding first digital signal;
(c) scan conversion means for changing an arrangement of data of the first digital signal and thereby converting the first digital signal into a second digital signal;
(d) means for processing the second digital signal into a coded signal through a predictive coding process;
(e) means for, during the predictive coding process, predicting first data of the second digital signal on the basis of only second data of the second digital signal, the first data corresponding to a first data picture element in a first scanning line, the second data corresponding to only a single second data picture element in a second scanning line adjacent to the first scanning line, the second data picture element being selected from picture elements in the second scanning line at which phases of the chrominance subcarrier are equal to a phase of the chrominance subcarrier at the first data picture element, the selected second data picture element being spatially closest to the first data picture element; and
(f) means for using the predicted first data in the predictive coding process.

4. The apparatus of claim 3 further comprising:
(a) means for transmitting the coded signal;
(b) means for receiving the coded signal;
(c) means for decoding the received coded signal into a third digital signal through a predictive decoding process;
(d) means for changing an arrangement of data of the third digital signal and thereby converting the third digital signal into a fourth digital signal; and
(e) means for converting the fourth digital signal into a corresponding analog color video signal.

5. The apparatus of claim 3 wherein the scan conversion means comprises a memory and an address generator outputting a write address signal and a read address signal to the memory; the data of the second digital signal are sequentially written into the memory in accordance with the write address signal; and the data are read out from the memory in accordance with the read address signal in a sequence different from a sequence of data written into memory.

* * * * *